(12) United States Patent
Munoz (10) Patent No.: US 12,228,843 B2
(45) Date of Patent: Feb. 18, 2025

(54) PORTABLE PHOTOGRAPHY STUDIO SYSTEM AND METHOD OF CONFIGURATION

(71) Applicant: Tomas Munoz, Lighthouse Point, FL (US)

(72) Inventor: Tomas Munoz, Lighthouse Point, FL (US)

(*) Notice: Subject to any disclaimer, the term of this patent is extended or adjusted under 35 U.S.C. 154(b) by 87 days.

(21) Appl. No.: 18/108,739

(22) Filed: Feb. 13, 2023

(65) Prior Publication Data

US 2024/0272523 A1    Aug. 15, 2024

(51) Int. Cl.
*G03B 15/06* (2021.01)

(52) U.S. Cl.
CPC .................... *G03B 15/06* (2013.01)

(58) Field of Classification Search
CPC ......... G03B 15/06; G03B 15/07; G03B 21/58
USPC ............................................. 396/3; 359/461
See application file for complete search history.

(56) References Cited

U.S. PATENT DOCUMENTS

| | | | | |
|---|---|---|---|---|
| 3,867,019 A | * | 2/1975 | Eyerman | G03B 15/06 |
| | | | | 343/915 |
| 5,579,180 A | * | 11/1996 | Geller | G03B 15/06 |
| | | | | 359/443 |
| 5,581,401 A | * | 12/1996 | Takamoto | G03B 21/58 |
| | | | | 359/461 |
| 7,680,401 B1 | * | 3/2010 | Adelstein | G03B 17/56 |
| | | | | 396/3 |
| 2013/0175414 A1 | * | 7/2013 | Nelson | G03B 15/06 |
| | | | | 248/158 |
| 2021/0211588 A1 | * | 7/2021 | Park | G06F 16/587 |
| 2021/0278752 A1 | * | 9/2021 | Christensen | G03B 17/561 |

FOREIGN PATENT DOCUMENTS

EP             635753 A1 *  1/1995      ............. G03B 15/06

* cited by examiner

*Primary Examiner* — Christopher E Mahoney
(74) *Attorney, Agent, or Firm* — BEKIARES ELIEZER LLP (57) ABSTRACT

A portable photography studio system and method of configuration that includes a portable light diffuser assembly and light diffuser wall that is selectively extendable and retractable to a desired height, a portable background assembly and a background wall (or backdrop) that is selectively extendable and retractable to a desired height, and two portable light diffuser assemblies with a wall that is selectively extendable and retractable to a desired height and has two opposing sides, one with a reflective surface and one with a non-reflective surface. The light diffuser wall is configured to be in front of a light source, like an LED spotlight, wherein the subject being photographed is interposed between the light diffuser wall, the background wall, and the walls of each of the two portable light diffuser assemblies.

16 Claims, 7 Drawing Sheets

PORTABLE PHOTOGRAPHY STUDIO SYSTEM AND METHOD OF CONFIGURATION

FIELD OF THE INVENTION

The present invention relates generally to systems and methods directed toward photography studios and, more particularly, relates to portable photography studios that can be configured for utilization, storage, and transportation by users.

BACKGROUND OF THE INVENTION

Many users and businesses desire the perfect environment to capture photographic images. One very popular method of creating this perfect environment involves an indoor setting utilizing artificial lighting with translucents. Lighting with translucents is not a new concept. Many known methods and systems create this type of lighting by expending large amounts of time and often require a significant amount of space and knowledge of configuring the lighting and translucents. This can be very problematic for novice photographers or those photographers with intermediate level of skill. Lighting with translucents or diffused lighting is most commonly used and desired in portrait photography, but is also utilized for other types of photography. The even light is flattering for subjects because it eliminates shadows, softens the face, and allows the subject to relax without squinting. "Softer" or "soft" light makes the image "warmer" and is also highly desired by many users. "Harder" or "hard" light, or direct light (artificial or natural), often creates high-contrast scenes with harsh shadows and sharp, bright highlights. Generating "soft" light in an effective and efficient manner is also highly sought after for different types of still life photography, such as food or product photography. In fact, most photoshoots that take place in an indoor studio use some form of diffusion.

Some known systems also do not allow users to illuminate a person's face easily and effectively, particular users without a significant amount of skill, training, or expertise. Some known systems and methods require the user to change power of the artificial light source (e.g., a spotlight) in order to change brightness of background or fill. This can often create the shadows not desired for many users, in addition to requiring more power input.

Additionally, most known systems and methods directed toward portable photography studios require arduous support assemblies that are often complicated and time consuming to assemble and disassemble. Some systems and methods directed toward studios using translucents that are relatively easy to assemble and dissemble, such as soft boxes, have significant size restrictions for the subject being photographed. Umbrellas and scrims are also common diffusion layer equipment that work in a similar way, but shape light differently, and do not provide a complete, efficient, effective, and comprehensive system to photograph using translucents.

Therefore, a need exists to overcome the problems with the prior art as discussed above.

SUMMARY OF THE INVENTION

The invention provides a portable photography studio system that overcomes the hereinafore-mentioned disadvantages of the heretofore-known devices and methods of this general type and that provides the necessary tools for any user to create high-quality lighting with less equipment and in less space. For photographers and cinematographers alike, the present invention provides system and method utilizing translucents that enables photographers and other users to produce high-quality portraits, i.e., providing a one-light studio configuration or a system configured to utilize stand-alone light-shaping tools. Additionally, the present invention only requires the photographer to move the photography subject closer or further away from diffuser wall to adjust the lighting instead of moving all of the lighting equipment, thereby making the photography session more effective and efficient.

With the foregoing and other objects in view, there is provided, in accordance with the invention, a portable photography studio system that includes a diffuser wall base housing a diffuser wall and having at least one diffuser support pole coupled to the diffuser wall base, wherein the diffuser wall is made of a translucent and flexible material and operably configured to have an extended position along a diffuser wall translation path and a retracted position rolled within the diffuser wall base and wherein the extended position includes the diffuser wall extended in an upright orientation and a length of at least 90 cm relative to the diffuser wall base and supported in the upright orientation with the at least one diffuser support pole. The system also includes a background wall base housing a background wall and having at least one background support pole coupled to the background wall base, wherein the background wall is made of an opaque and flexible material and operably configured to have an extended position along a background wall translation path and a retracted position rolled within the background wall base and wherein the extended position includes the background wall extended in an upright orientation and a length of at least 90 cm relative to the diffuser wall base and supported in the upright orientation with the at least one background support pole. Further, the system includes a first reflector wall base housing a first reflector wall and having at least one first reflector support pole coupled to the first reflector wall base, wherein the first reflector wall is made of an opaque and flexible material, with a reflective front surface, with a non-reflective rear surface opposing the front surface of the first reflector wall, and operably configured to have an extended position along a first reflector wall translation path and a retracted position rolled within the first reflector wall base and wherein the extended position includes the first reflector wall extended in an upright orientation and a length of at least 90 cm relative to the first reflector wall base and supported in the upright orientation with the at least one first reflector support pole. Additionally, the system includes a second reflector wall base housing a second reflector wall and having at least one second reflector support pole coupled to the second reflector wall base, wherein the second reflector wall is made of an opaque and flexible material, with a reflective front surface, with a non-reflective rear surface opposing the front surface of the second reflector wall, and operably configured to have an extended position along a second reflector wall translation path and a retracted position rolled within the second reflector wall base and wherein the extended position includes the second reflector wall extended in an upright orientation and a length of at least 90 cm relative to the second reflector wall base and supported in the upright orientation with the at least one second reflector support pole.

In accordance with another feature, an embodiment of the present invention also includes a substantially planar floor mat of an elastic material with a lower surface and an upper surface opposing the lower surface of the substantially planar floor mat, wherein the upper surface has a plurality of enclosed individual demarcation lines each corresponding with perimeter outlines the diffuser wall base, the background wall base, and the first and second reflector wall bases.

In accordance with yet another feature, an embodiment of the present invention also includes the plurality of enclosed individual demarcation lines each having a diffuser base demarcation line with an elongated direction disposed in an angled non-paralleled orientation relative to the perimeter edge of the substantially planar floor mat, a background base demarcation line with an elongated direction disposed in a paralleled orientation relative to the perimeter edge of the substantially planar floor mat, a first reflector base demarcation line with an elongated direction disposed in an angled non-paralleled orientation relative to the perimeter edge of the substantially planar floor mat, and a second reflector base demarcation line with an elongated direction disposed in an angled non-paralleled orientation relative to the perimeter edge of the substantially planar floor mat.

In accordance with a further feature, an embodiment of the present invention also includes the diffuser wall base, the background wall base, and the first and second reflector wall bases each having a spring biasing the respective diffuser wall, the background wall, and the first and second reflector walls in the retracted positions.

In accordance with an additional feature, an embodiment of the present invention also includes an LED spotlight with a variable color temperature range from 2700K-6500K.

In accordance with a further feature of the present invention, the first and second reflector walls each have perimeter edges defining front and rear surface areas, the reflective front surface and the non-reflective rear surface of the first and second reflector walls spanning the front and rear surface areas, respectively.

In accordance with an exemplary feature of the present invention, the reflective front surface is of a metallic silver color and the non-reflective rear surface is of a neutral white color.

In accordance with a further feature of the present invention, the at least one diffuser support pole, the at least one background support pole, and the at least one first reflector support pole are each of a telescopic configuration configured to extend, retract, and have at least one locked configuration.

In accordance with another feature of the present invention also includes the diffuser wall base, the background wall base, and the first and second reflector wall bases each having a foot pad projecting from each of the diffuser wall base, the background wall base, and the first and second reflector wall bases and having a fastener coupled to the foot pad and configured to threadedly couple with the at least one diffuser support pole, wherein the at least one background support pole, and the at least one first reflector support pole, respectively, for the diffuser wall base, the background wall base, and the first and second reflector wall bases.

Also in accordance with the present invention, a method of configuring a portable photography studio includes providing a diffuser wall base with a selectively extendable and retractable flexible diffuser wall coupled thereto and of a translucent material, a background wall base with a selectively extendable and retractable flexible background wall coupled thereto and of an opaque material, a first reflector wall base with a selectively extendable and retractable flexible first reflector wall coupled thereto and with a reflective front surface, and a second reflector wall base with a selectively extendable and retractable flexible second reflector wall coupled thereto and with a non-reflective front surface. The method also includes providing a portable spotlight operably configured to emit a light therefrom, placing the diffuser wall base on a ground surface and extending the retractable flexible diffuser wall in an upright orientation and a length of at least 90 cm relative to the diffuser wall base, placing the portable spotlight behind the retractable flexible diffuser wall, placing the background wall base on the ground surface and extending the retractable flexible background wall in an upright orientation and a length of at least 90 cm relative to the background wall base and facing both the retractable flexible diffuser wall and the portable spotlight, placing the first reflector wall base on the ground surface and extending the retractable flexible first reflector wall in an upright orientation and a length of at least 90 cm relative to the first reflector wall base and with the reflective front surface facing both the retractable flexible diffuser wall and the portable spotlight, wherein the first reflector wall base is disposed proximal to the diffuser wall base, and also placing the second reflector wall base on the ground surface and extending the retractable flexible second reflector wall in an upright orientation and a length of at least 90 cm relative to the second reflector wall base and with the non-reflective front surface facing the retractable flexible background wall, wherein the second reflector wall base is disposed proximal to the first reflector wall base.

In accordance with another feature, an embodiment of the present invention also includes providing a substantially planar floor mat of an elastic material with a lower surface and an upper surface opposing the lower surface of the substantially planar floor mat, wherein the upper surface has a plurality of enclosed individual demarcation lines each corresponding with perimeter outlines the diffuser wall base, the background wall base, and the first and second reflector wall bases. The method includes placing the lower surface of the floor mat on the ground surface and placing the diffuser wall base, the background wall base, the first reflector wall base, and the second reflector wall base within its respective one of the plurality of enclosed individual demarcation lines.

In accordance with yet another feature, an embodiment of the present invention also includes providing the diffuser wall base, the background wall base, and the first and second reflector wall bases with a spring biasing the respective diffuser wall, the background wall, and the first and second reflector walls in a retractable position.

In accordance with another feature, an embodiment of the present invention also includes providing the LED spotlight with a variable color temperature range from 2700K-6500K and providing the first and second reflector walls having perimeter edges defining front and rear surface areas, wherein the reflective front surface and the non-reflective rear surface of the first and second reflector walls spanning the front and rear surface areas, respectively.

In accordance with a further feature, an embodiment of the present invention also includes providing the reflective front surface with a metallic silver color and the non-reflective rear surface with a neutral white color.

In accordance with an additional feature, an embodiment of the present invention also includes extending the retractable flexible diffuser wall in the upright orientation and supporting the retractable flexible diffuser wall in said upright orientation with at least one diffuser support pole, extending the retractable flexible background wall in the upright orientation and supporting the retractable flexible background wall in said upright orientation with at least one background support pole, extending the first reflector wall in the upright orientation and supporting the first reflector wall in said upright orientation with at least one first reflector support pole, and extending the second reflector wall in the upright orientation and supporting the first reflector wall in said upright orientation with at least one first reflector support pole.

Although the invention is illustrated and described herein as embodied in a portable photography studio system and method of configuration, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the pole of the umbrella.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient portable photography studio system and method that overcomes the above-described disadvantages by creating a portable photography studio configured to utilize artificial lighting and translucents ideal for portraits.

Figure 1:
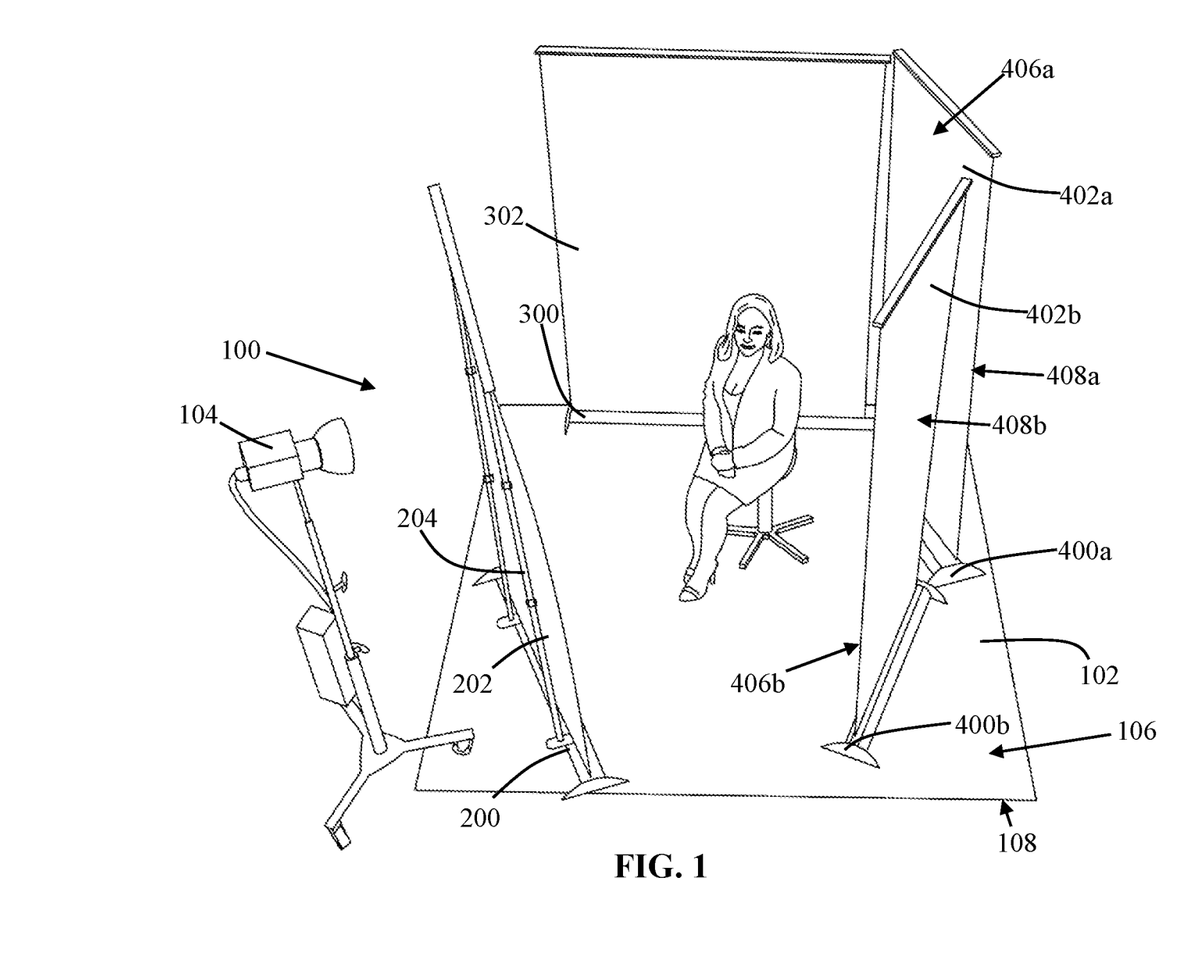
FIG. 1 is a perspective view of a portable photography studio system configuration in accordance with one embodiment of the present invention.

Referring now to FIG. 1, one embodiment of the present invention is shown in a perspective view. FIG. 1, along with the other figures depicted, shows several advantageous features of the present invention, but, as will be described below, the invention can be provided in several shapes, sizes, combinations of features and components, and varying numbers and functions of the components. The first example of a portable photography studio system 100, as shown in FIG. 1, may include a diffuser wall assembly, a background wall assembly, one or more reflector wall assemblies, a custom floor mat 102, and an LED spotlight 104.

Figure 2:
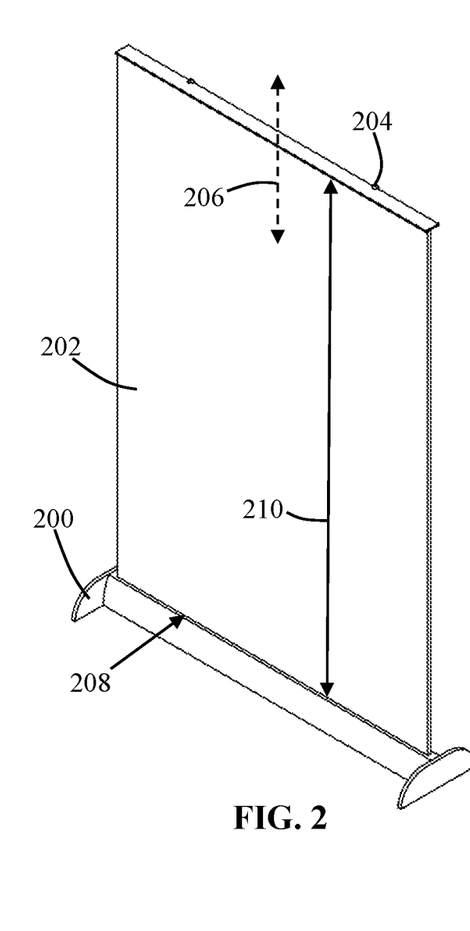
FIGS. 2-4 are perspective views of a diffuser wall assembly, a background wall assembly, and a reflector wall assembly, respectively, in accordance with one embodiment of the present invention.

As seen best in FIGS. 1-2, the diffuser wall assembly includes a diffuser wall base 200 housing a retractable, extendable, and flexible diffuser wall 202 and having at least one diffuser support pole 204 coupled to the diffuser wall base 200. The diffuser wall 202 is of a translucent material. As used herein, the term "wall" is intended broadly to encompass continuous structures, as well as, separate structures that are coupled together so as to form a substantially continuous external surface. In one embodiment, the diffuser wall 202 may be of a white polyester fabric, satin, silk, etc., and otherwise permitting light to pass therethrough and not completely transparent. The diffuser wall 202 is beneficially extendable and retractable relative to the diffuser wall base 200 and, to that end, is operably configured to have an extended position along a diffuser wall translation path and a retracted position rolled within the diffuser wall base. An exemplary diffuser wall translation path is depicted in FIG. 2 with arrow 206, wherein the diffuser wall translation path 206 may be primarily linear but may be curvilinear or curved in some embodiments and during certain paths of movement. The extended position along the diffuser wall translation path 206 includes the diffuser wall 202 extended in an upright orientation and a length of 210 of at least 90 cm, or approximately 36 in, relative to the diffuser wall base 200, i.e., an upper surface, e.g., surface 208. In other embodiments, the length 210 is approximately 243 cm, or approximately 96 in.

Figure 10:
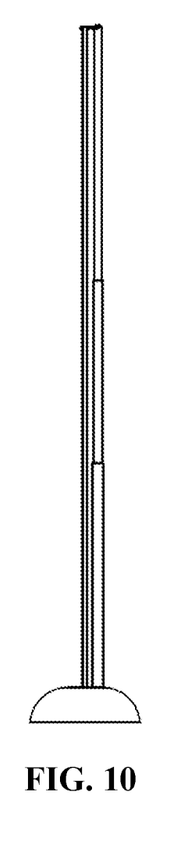
Figure 11:
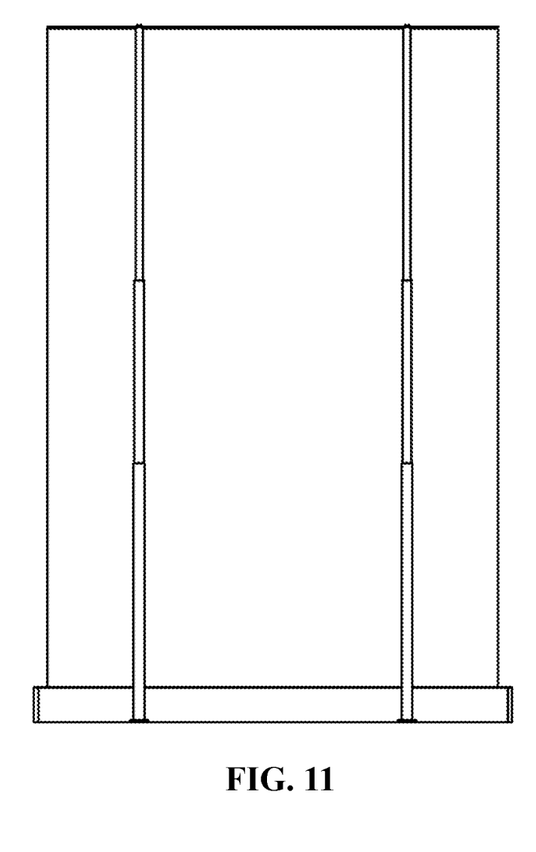
Figure 15:
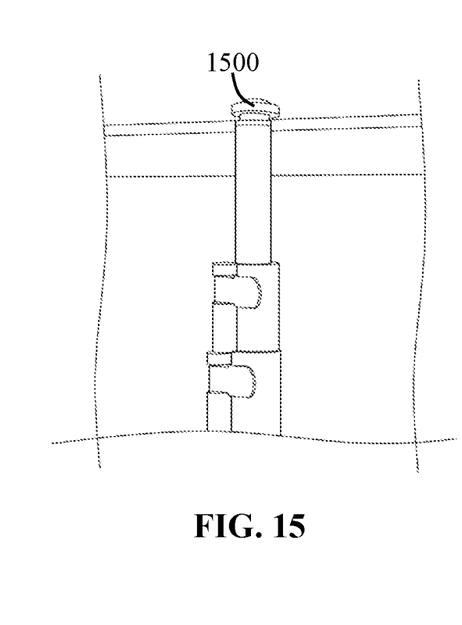
FIG. 15 depicts a fragmentary close-up perspective views of an extended wall in accordance with one embodiment of the present invention.

The diffuser wall 202 is supported in the upright orientation with one or more diffuser support pole(s) 204. In one embodiment, the support pole(s) 204 are of a substantially rigid and lightweight material such as aluminum, PVC, etc. The support pole(s) may be fastened into a base or wall by twisting the pole(s) into one or more fastener(s). The supports pole(s) utilized for maintaining the extendable walls described and depicted herein in the upright orientation may be preferably of a telescopic configuration configured to extend, retract, and have at least one locked configuration, thereby beneficially providing a system conducive for quick and effective assembly and disassembly. The telescopic nature of the support pole(s) can be best seen exemplified in FIG. 10, but each support pole may include one or more collars with a fastener configured to retain one or more sections of the pole in the locked configuration (e.g., with the lockable collars depicted in FIG. 15). In other embodiments, a spring-loaded detent and stopper that keeps the sections (e.g., tubes of the pole(s)) spaced approximately 5-7 cm above one another may be utilized.

Figure 13:
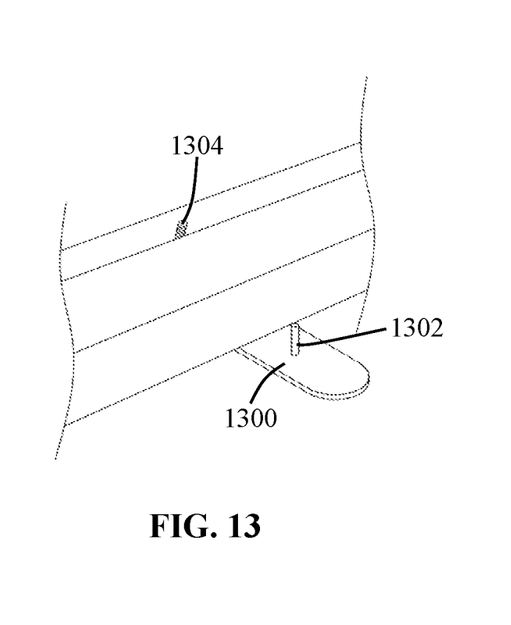
FIGS. 13-14 depict fragmentary close-up perspective views of a base assembly in accordance with one embodiment of the present invention.
Figure 14:
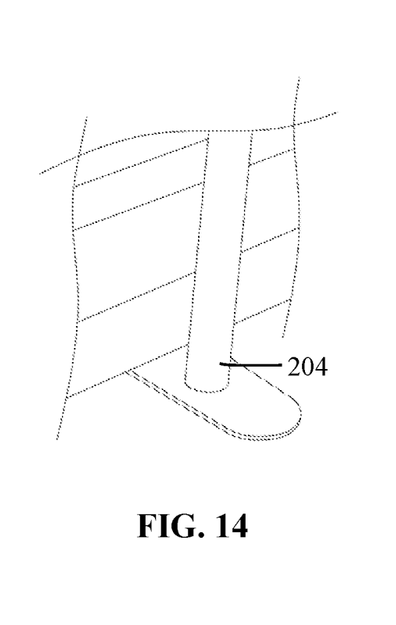

In one embodiment, the base 200 utilized with the diffuser wall 202 is also made with a substantially rigid and lightweight material. The other bases described herein are also similarly constructed. Additionally, as exemplified in FIGS. 13-14, the bases utilized with the walls, i.e., the diffuser wall base 200, the background wall base 300, and the first and second reflector wall bases 400a-b, may also include a foot pad 1300 or plate-like portion of the base projecting therefrom. The foot pad 1300 may be configured to rest on the ground surface and have a fastener 1302 coupled to the foot pad 1300 and in the upright orientation. In one embodiment, a base may include two support pads located proximal to the side ends of the base, i.e., at or near (within 10% of the overall width), wherein said pads aid in keeping the assembly level relative to the ground surface. The fastener 1302 is configured to threadedly couple or engage with a support pole, e.g., the at least one diffuser support pole 204, wherein the other end of the support pole is directly coupled with the upper end of the wall when extended upwardly. In one embodiment, the upper end of the wall that is configured to extend and retract includes a substantially rigid end cap member that includes one or more portions configured to couple with the pole(s), e.g., using a fastener assembly 1304, 1500 exemplified in FIG. 13 and FIG. 15. It should be understood that terms such as, "front," "upper", "rear," "side," "top," "bottom," and the like are indicated from the reference point of a viewer viewing the device oriented in the figures.

The diffuser wall base 200 can also be seen partially or completely (depending on the wall's position) housing the diffuser wall 202 in a rolled or semi-rolled configuration for extension by the user. In some embodiments, the extension of the diffuser wall 202 is done manually by the user, wherein the user may grasp a tab or other part of the diffuser wall 202 and pull upwardly to the desired height or length 210 when it is held in place by the support pole(s). In other embodiment, the base(s) may include a motor to facilitate in the extension and/or retraction of the wall from the base. The diffuser wall base 200, along the other bases disclosed herein, may also beneficially include a spring biasing the respective wall, e.g., diffuser wall 202, in the retracted position, thereby requiring the user to support the wall to prevent the wall from retracting back into the base.

Figure 3:
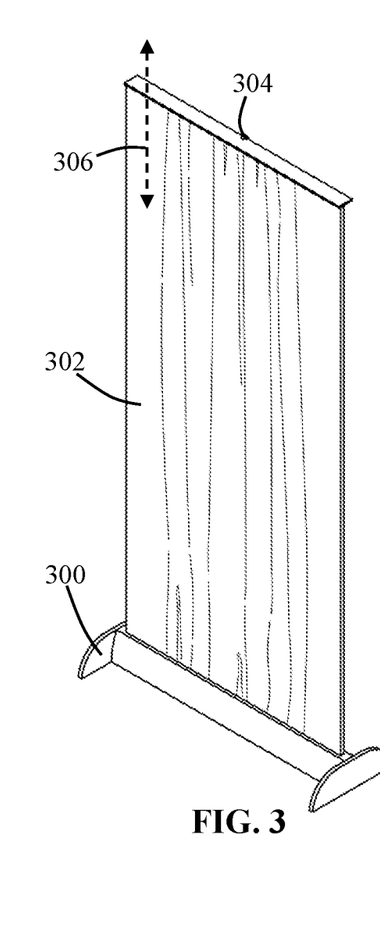

Referring back to FIG. 1 with reference to FIG. 3, the portable photography studio system 100 also includes the background wall base 300 housing a background wall 302 (also known as "backdrop"). As discussed above, the background wall 302 also includes at least one background support pole 304 coupled to the background wall base 300. Further, the background wall 302 is preferably made of an opaque and flexible material, e.g., polyester or canvas, and may include a design thereon or preferably of a solid color, e.g., white, or black. The background wall 302 is similarly operably configured to have an extended position along a background wall translation path and a retracted position rolled within the background wall base 300, wherein the extended position includes the background wall 302 extended in an upright orientation and a length of at least 90 cm relative to the diffuser wall base 300. The background wall 302 is supported in the upright orientation with the at least one background support pole 304, as desired by the user.

Figure 4:
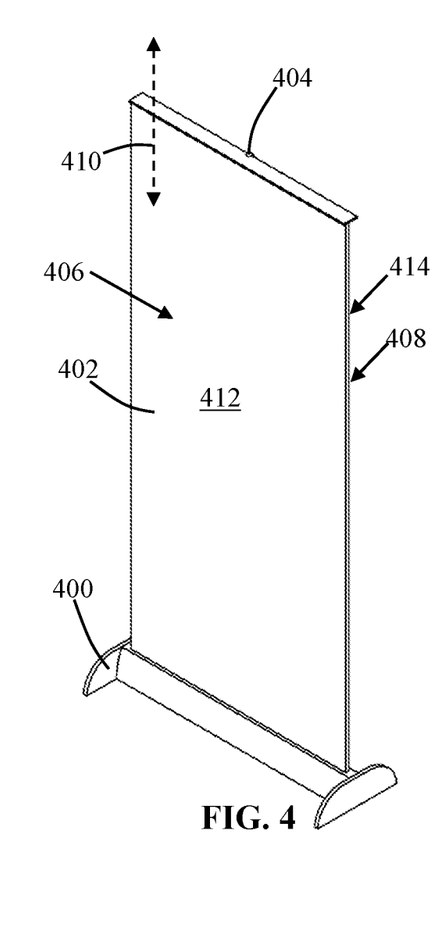
Figure 5:
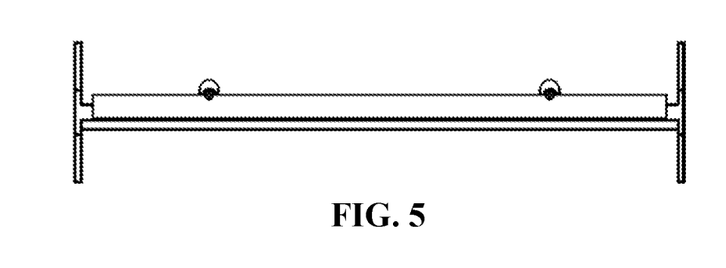
FIGS. 5-7 are top plan views of a diffuser wall assembly, a background wall assembly, and a reflector wall assembly, respectively, in accordance with one embodiment of the present invention.
Figure 6:
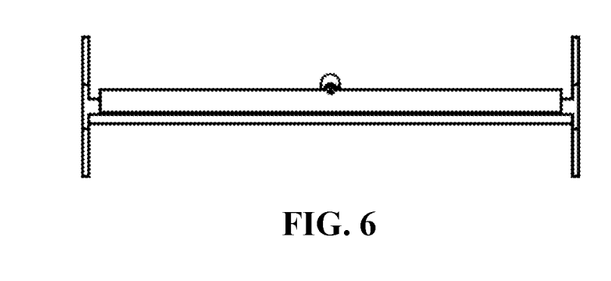
Figure 7:
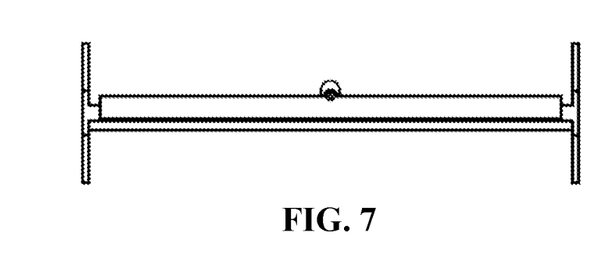
Figure 8:
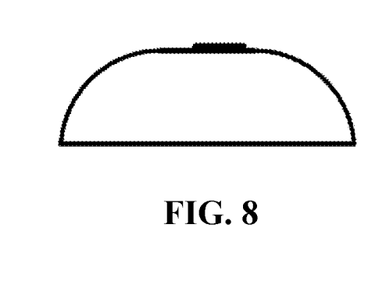
FIG. 8 is an elevational side view of a base utilized with an extendable and retractable wall in accordance with one embodiment of the present invention.
Figure 9:
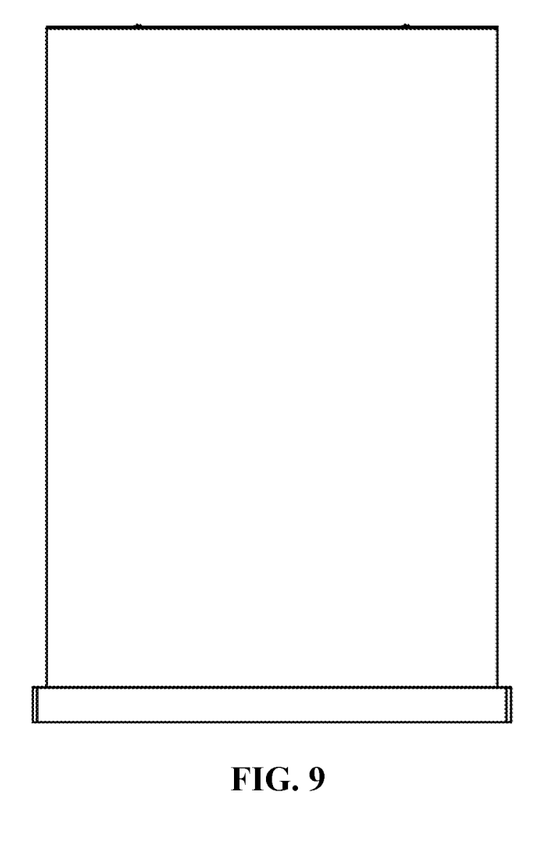
FIGS. 9-11 are elevational front, side, and rear views, respectively, of a diffuser wall assembly in accordance with one embodiment of the present invention.

Beneficially and with reference to FIG. 1 in combination with FIG. 4, the system 100 is configured and utilized with first and second reflector wall bases 400a-b having walls 402a-b selectively extendable and retracted therefrom. More specifically, the first reflector wall base 400a houses a first reflector wall 402a and that includes at least one first reflector support pole 404 coupled to the first reflector wall base 400a. The first reflector wall 402a is made of an opaque and flexible material, has a reflective front surface 406, a non-reflective rear surface 408a opposing the front surface of the first reflector wall 402a, and is operably configured to have an extended position along a first reflector wall translation path and a retracted position rolled within the first reflector wall base 400a. The extended position includes the first reflector wall 402a extended in an upright orientation and a length of at least 90 cm relative to the first reflector wall base 400a and supported in the upright orientation with the at least one first reflector support pole 404.

The second reflector wall base 400b also houses (partially or completely) a second reflector wall 402b and includes at least one second reflector support pole 404 coupled to the second reflector wall base 400*b*, wherein the second reflector wall 402*b* is also made of an opaque and flexible material, with a reflective front surface 406, with a non-reflective rear surface 408*b* opposing the front surface of the second reflector wall 402*b*, and is operably configured to have an extended position along a second reflector wall translation path and a retracted position rolled within the second reflector wall base 400*b*. The extended position includes the second reflector wall 402*b* extended in an upright orientation and a length of at least 90 cm relative to the second reflector wall base 400*b* and that is supported in the upright orientation with the at least one second reflector support pole 404. The first and second reflector walls 402*a*-*b* beneficially enable the user to create, with the other structures disclosed herein, a non-specular fill desirous by many users, particularly in the context of portraits. Said another way, the reflective surfaces of the walls are used for a specular separation of light, while the non-reflective surfaces of the walls, e.g., white sides, are used to fill light directed toward the subject being photographed. The reflector walls 402*a*-*b*, like the other walls depicted and described herein, are configured to stand alone independently of one another and be moved around. The width of the reflector walls 402*a*-*b*, like the other walls depicted and described herein, may be approximately 91-122 cm, or approximately 3-4 ft, and may uniformly span that width from the upper and lower ends of the wall to effectuate retraction and extension of the walls 402*a*-*b* from the respective base 400*a*-*b*.

The reflector walls 402*a*-*b* enable a user to selectively fill dark shadows or bounce light onto the subject. Said another way, the reflector walls 402*a*-*b* may be made with white and silver opposing surfaces of the wall for controlling, modifying, and directing light. For example, the reflective surface, which may be of a solid metallic silver color, produces a hard light quality with increased contrast and specular highlights. The non-reflective surface, which may be of a solid neutral white color, produces a softer quality of light with maintained color balance. The walls may be double laminated for high reflectance on one surface thereon. The background wall translation path 306 and the first and second reflector wall translation paths 410 may be in the same direction and orientation as the diffuser wall translation path 206. In one embodiment, the first and second reflector walls 402*a*-*b*, like the other walls depicted herein, each have perimeter edges defining front and rear surface areas 412, 414 (exemplified best in FIG. 4) that are equal. The reflective front surface 406 and the non-reflective rear surface 408*a* of the first and second reflector walls 402*a*-*b* spanning the front and rear surface areas, respectively, i.e., the entire surface is reflective or non-reflective.

In one embodiment, the system 100 also utilizes a substantially planar floor mat 102 that may of a dimension of approximately 8 ft×8 ft or 8 ft×10 ft. The floor mat 102 can be seen exemplified in FIG. 1 and FIG. 12. The floor mat 102 is made primarily with an elastic material, e.g., natural rubber, that includes a lower surface 108 and an upper surface 106 opposing the lower surface 108 of the substantially planar floor mat 102. The upper surface 106 may include a felt material disposed thereon and have rubber exposed on the lower surface 108. The upper surface 106 beneficially includes a plurality of enclosed individual demarcation lines 1200, 1202, 1204, 1206 that each specifically correspond with perimeter outlines of the diffuser wall base 200, the background wall base 300, and the first and second reflector wall bases 400*a*-*b*. These demarcation lines 1200, 1202, 1204, 1206 enable the user to specially configure the wall bases and corresponding walls in a particular configuration that has been found, after experimentation, to be the most beneficial, versatile, and effective in taking portraits.

Figure 12:
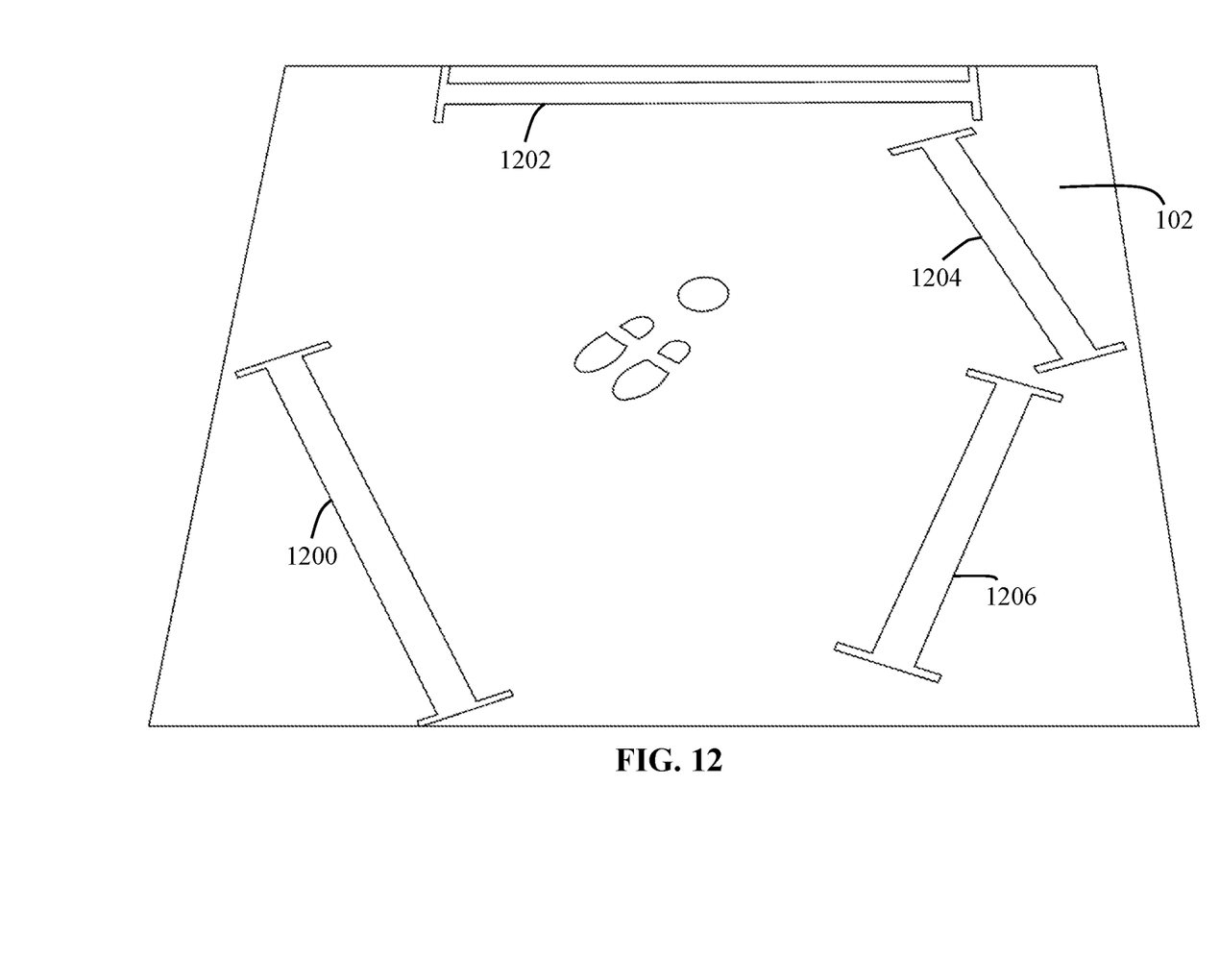
FIG. 12 is a perspective view of a substantially planar floor mat utilized with the portable photography studio system in accordance with one embodiment of the present invention.

The angular positions and orientations of the enclosed individual demarcation lines 1200, 1202, 1204, 1206 also enable the user to position a spotlight 104 proximal thereto in order to create high-quality lighting with photography with less equipment and in less space that any known portable photography systems. In one embodiment, the LED spotlight 104 utilized with the system 100 includes a variable color temperature range from 2700K-6500K, thereby generating, with the walls 202, 302, 402*a*-*b*, an environment advantageous to obtaining portraits with translucent lighting. In one embodiment, the user will be able to move the spotlight 104, which may have a tripod or stand, forward or back from the diffuser wall 202 to minimize shadow or illuminate panne and not background. If not enough fill or separation, then the increase intensity of power or beneficially move the subject closer or farther away from the diffuser wall 202.

As exemplified in FIG. 12, the plurality of enclosed individual demarcation lines 1200, 1202, 1204, 1206 are specifically configured such that the diffuser base demarcation line 1200 has an elongated direction disposed in an angled non-paralleled orientation relative to the perimeter edge of the substantially planar floor mat 102, the background base demarcation line 1202 has an elongated direction disposed in a paralleled orientation relative to the perimeter edge of the substantially planar floor mat 102, the first reflector base demarcation line 1204 with an elongated direction disposed in an angled non-paralleled orientation relative to the perimeter edge of the substantially planar floor mat 102, and the second reflector base demarcation line 1206 with an elongated direction disposed in an angled non-paralleled orientation relative to the perimeter edge of the substantially planar floor mat 102.

Figure 16:
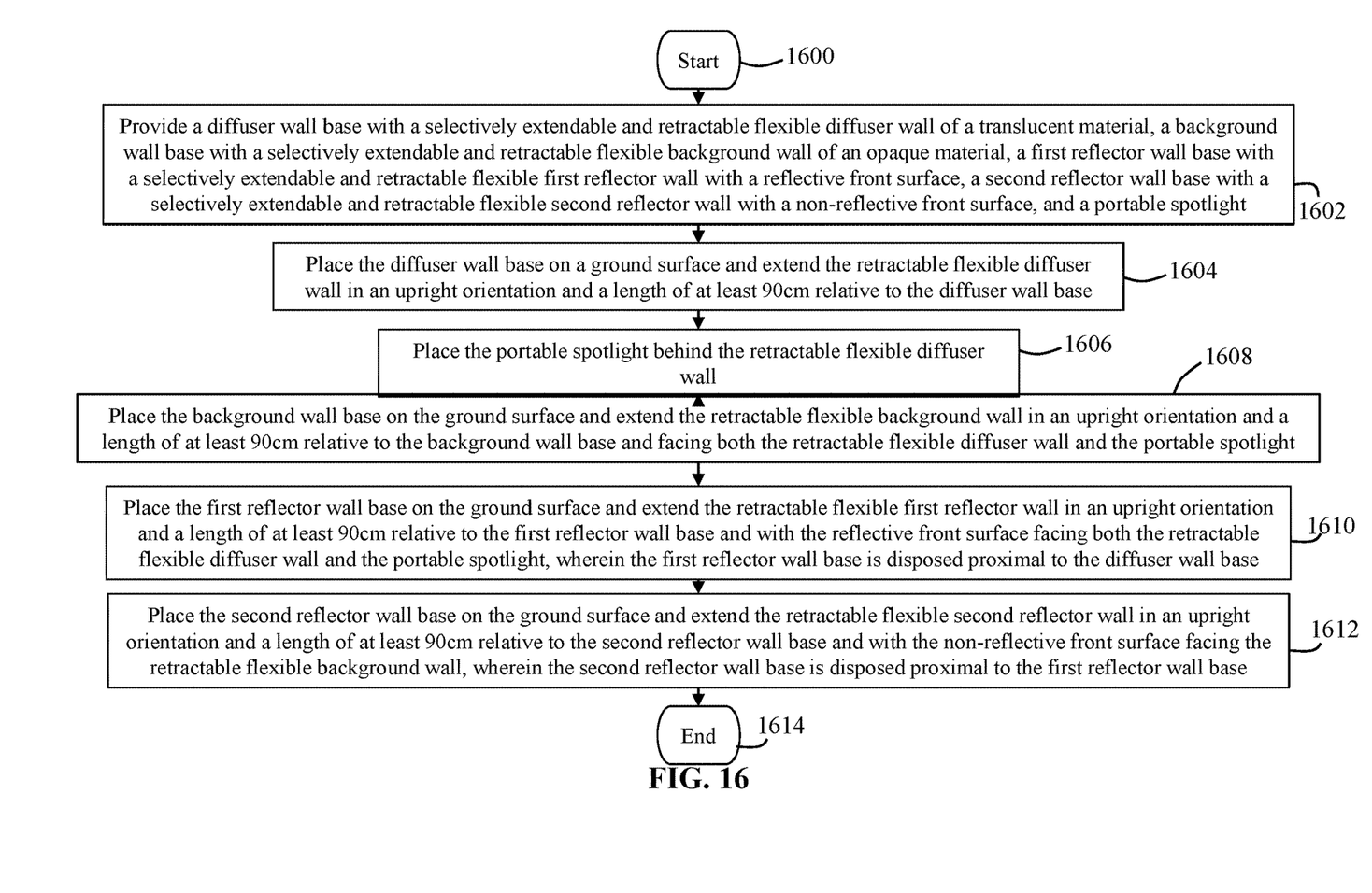
FIG. 16 is a process flow diagram depicting a method of configuring a portable photography studio in accordance with one embodiment of the present invention.

FIGS. 1-15 will now be described in conjunction with the process flow chart of FIG. 16, which depicts an exemplary and beneficial method of configuring a portable photography studio. Although FIG. 16 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 16 for the sake of brevity. In some embodiments, some or all of the process steps included in FIG. 16 can be combined into a single process.

Specifically, the process of configuring a portable photography studio may start at step 1600 and immediately proceed to step 1602 of providing a diffuser wall base 200 with a selectively extendable and retractable flexible diffuser wall 202 coupled thereto and of a translucent material, a background wall base 300 with a selectively extendable and retractable flexible background wall 302 coupled thereto and of an opaque material, a first reflector wall base 400*a* with a selectively extendable and retractable flexible first reflector wall 402*a* coupled thereto and with a reflective front surface, and a second reflector wall base 400*b* with a selectively extendable and retractable flexible second reflector wall 402*b* coupled thereto and with a non-reflective front surface. The above-referenced structures have the same features and functionality discussed above. The process also includes providing a portable spotlight 104 operably configured to emit a light therefrom.

Next, step 1604 includes placing the diffuser wall base 200 on a ground surface and extending the retractable flexible diffuser wall 202 in an upright orientation and a length of at least 90 cm relative to the diffuser wall base 200. The user will preferably raise the diffuser wall 202 a desired height to reach the portion of the portable spotlight configured to emit the light therefrom and at a height equal to or greater than the subject desired to be photographed. Like all walls disclosed herein, the user may then lock the wall at the desired height and support the same with one or more support pole(s), e.g., by extending the poles to the desired height and fastening the upper end of the wall to the support pole. Step 1606 includes placing the portable spotlight behind the retractable flexible diffuser wall 202 and step 1608 includes placing the background wall base 300 on the ground surface and extending the retractable flexible background wall 302 in an upright orientation and a length of at least 90 cm relative to the background wall base 200 and facing both the retractable flexible diffuser wall 202 and the portable spotlight 104. The flexible background wall 302 is preferably extended to the approximate height of the diffuser wall 202.

Next, the process moves to step 1610 of placing the first reflector wall base 400a on the ground surface and extending the retractable flexible first reflector wall 402a in an upright orientation and a length of at least 90 cm relative to the first reflector wall base 400a and with the reflective front surface facing both the retractable flexible diffuser wall 202 and the portable spotlight 104, wherein the first reflector wall base 400a is disposed proximal to the diffuser wall base 200, i.e., within approximately 30 cm. Step 1612 of the process may include placing the second reflector wall base 400b on the ground surface and extending the retractable flexible second reflector wall 402b in an upright orientation and a length of at least 90 cm relative to the second reflector wall base 400b and with the non-reflective front surface facing the retractable flexible background wall 302, wherein the second reflector wall base 400b is disposed proximal to the first reflector wall base 400a. The first and second reflector walls 402a-b are preferably extended to the approximate height of the diffuser wall 202. At this point, the user activates the light from the spotlight to illuminate the subject through translucents. Each of the walls may be retracted when finished by the user for ease of storage and transportation.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above-described features.

Additional embodiments of the above-described process include providing a substantially planar floor mat 102 of an elastic material with a lower surface and an upper surface opposing the lower surface of the substantially planar floor mat 102, wherein the upper surface has a plurality of enclosed individual demarcation lines each corresponding with perimeter outlines the diffuser wall base 200, the background wall base 300, and the first and second reflector wall bases 400a-b. The process may also include placing the lower surface of the floor mat 102 on the ground surface and placing the diffuser wall base 200, the background wall base 300, the first reflector wall base 400a, and the second reflector wall base 400b within their respective one of the plurality of enclosed individual demarcation lines corresponding thereto.

What is claimed is:

1. A portable photography studio system comprising:
a diffuser wall base housing a diffuser wall and having at least one diffuser support pole coupled to the diffuser wall base, the diffuser wall of a translucent and flexible material and operably configured to have an extended position along a diffuser wall translation path and a retracted position rolled within the diffuser wall base, the extended position including the diffuser wall extended in an upright orientation and a length of at least 90 cm relative to the diffuser wall base and supported in the upright orientation with the at least one diffuser support pole;
a background wall base housing a background wall and having at least one background support pole coupled to the background wall base, the background wall of an opaque and flexible material and operably configured to have an extended position along a background wall translation path and a retracted position rolled within the background wall base, the extended position including the background wall extended in an upright orientation and a length of at least 90 cm relative to the diffuser wall base and supported in the upright orientation with the at least one background support pole;
a first reflector wall base housing a first reflector wall and having at least one first reflector support pole coupled to the first reflector wall base, the first reflector wall of an opaque and flexible material, with a reflective front surface, with a non-reflective rear surface opposing the front surface of the first reflector wall, and operably configured to have an extended position along a first reflector wall translation path and a retracted position rolled within the first reflector wall base, the extended position including the first reflector wall extended in an upright orientation and a length of at least 90 cm relative to the first reflector wall base and supported in the upright orientation with the at least one first reflector support pole; and
a second reflector wall base housing a second reflector wall and having at least one second reflector support pole coupled to the second reflector wall base, the second reflector wall of an opaque and flexible material, with a reflective front surface, with a non-reflective rear surface opposing the front surface of the second reflector wall, and operably configured to have an extended position along a second reflector wall translation path and a retracted position rolled within the second reflector wall base, the extended position including the second reflector wall extended in an upright orientation and a length of at least 90 cm relative to the second reflector wall base and supported in the upright orientation with the at least one second reflector support pole.

2. The portable photography studio system according to claim 1, further comprising:
a substantially planar floor mat of an elastic material with a lower surface and an upper surface opposing the lower surface of the substantially planar floor mat, the upper surface having a plurality of enclosed individual demarcation lines each corresponding with perimeter outlines the diffuser wall base, the background wall base, and the first and second reflector wall bases.

3. The portable photography studio system according to claim 2, wherein the plurality of enclosed individual demarcation lines each further comprise:

a diffuser base demarcation line with an elongated direction disposed in an angled non-paralleled orientation relative to a perimeter edge of the substantially planar floor mat;

a background base demarcation line with an elongated direction disposed in a paralleled orientation relative to the perimeter edge of the substantially planar floor mat;

a first reflector base demarcation line with an elongated direction disposed in an angled non-paralleled orientation relative to the perimeter edge of the substantially planar floor mat; and a second reflector base demarcation line with an elongated direction disposed in an angled non-paralleled orientation relative to the perimeter edge of the substantially planar floor mat.

4. The portable photography studio system according to claim 1, wherein the diffuser wall base, the background wall base, and the first and second reflector wall bases each further comprising:

a spring biasing the respective diffuser wall, the background wall, and the first and second reflector walls in the retracted positions.

5. The portable photography studio system according to claim 1, further comprising:

an LED spotlight with a variable color temperature range from 2700K-6500K.

6. The portable photography studio system according to claim 1, wherein the first and second reflector walls each further comprise perimeter edges defining front and rear surface areas, the reflective front surface and the non-reflective rear surface of the first and second reflector walls spanning the front and rear surface areas, respectively.

7. The portable photography studio system according to claim 1, wherein:

the reflective front surface is of a metallic silver color and the non-reflective rear surface is of a neutral white color.

8. The portable photography studio system according to claim 1, wherein:

the at least one diffuser support pole, the at least one background support pole, and the at least one first reflector support pole are each of a telescopic configuration configured to extend, retract, and have at least one locked configuration.

9. The portable photography studio system according to claim 1, wherein the diffuser wall base, the background wall base, and the first and second reflector wall bases each further comprise:

a foot pad projecting from each of the diffuser wall base, the background wall base, and the first and second reflector wall bases and having a fastener coupled to the foot pad and configured to threadedly couple with the at least one diffuser support pole, the at least one background support pole, and the at least one first reflector support pole, respectively, for the diffuser wall base, the background wall base, and the first and second reflector wall bases.

10. A method of configuring a portable photography studio comprising:

providing a diffuser wall base with a selectively extendable and retractable flexible diffuser wall coupled thereto and of a translucent material, a background wall base with a selectively extendable and retractable flexible background wall coupled thereto and of an opaque material, a first reflector wall base with a selectively extendable and retractable flexible first reflector wall coupled thereto and with a reflective front surface, and a second reflector wall base with a selectively extendable and retractable flexible second reflector wall coupled thereto and with a non-reflective front surface;

providing a portable spotlight operably configured to emit a light therefrom;

placing the diffuser wall base on a ground surface and extending the retractable flexible diffuser wall in an upright orientation and a length of at least 90 cm relative to the diffuser wall base;

placing the portable spotlight behind the retractable flexible diffuser wall;

placing the background wall base on the ground surface and extending the retractable flexible background wall in an upright orientation and a length of at least 90 cm relative to the background wall base and facing both the retractable flexible diffuser wall and the portable spotlight;

placing the first reflector wall base on the ground surface and extending the retractable flexible first reflector wall in an upright orientation and a length of at least 90 cm relative to the first reflector wall base and with the reflective front surface facing both the retractable flexible diffuser wall and the portable spotlight, the first reflector wall base disposed proximal to the diffuser wall base; and placing the second reflector wall base on the ground surface and extending the retractable flexible second reflector wall in an upright orientation and a length of at least 90 cm relative to the second reflector wall base and with the non-reflective front surface facing the retractable flexible background wall, the second reflector wall base disposed proximal to the first reflector wall base.

11. The method according to claim 10, further comprising:

providing a substantially planar floor mat of an elastic material with a lower surface and an upper surface opposing the lower surface of the substantially planar floor mat, the upper surface having a plurality of enclosed individual demarcation lines each corresponding with perimeter outlines the diffuser wall base, the background wall base, and the first and second reflector wall bases; and placing the lower surface of the floor mat on the ground surface and placing the diffuser wall base, the background wall base, the first reflector wall base, and the second reflector wall base within its respective one of the plurality of enclosed individual demarcation lines.

12. The method according to claim 10, further comprising:

providing the diffuser wall base, the background wall base, and the first and second reflector wall bases with a spring biasing the respective diffuser wall, the background wall, and the first and second reflector walls in a retractable position.

13. The method according to claim 10, further comprising:

providing an LED spotlight with a variable color temperature range from 2700K-6500K.

14. The method according to claim 10, further comprising:

providing the first and second reflector walls having perimeter edges defining front and rear surface areas, wherein the reflective front surface and a non-reflective rear surface of the first and second reflector walls span the front and rear surface areas, respectively.

15. The method according to claim 14, further comprising:
   providing the reflective front surface with a metallic silver color and the non-reflective rear surface with a neutral white color.

16. The method according to claim 10, further comprising:
   extending the retractable flexible diffuser wall in the upright orientation and supporting the retractable flexible diffuser wall in said upright orientation with at least one diffuser support pole;
   extending the retractable flexible background wall in the upright orientation and supporting the retractable flexible background wall in said upright orientation with at least one background support pole;
   extending the first reflector wall in the upright orientation and supporting the first reflector wall in said upright orientation with at least one first reflector support pole; and
   extending the second reflector wall in the upright orientation and supporting the first reflector wall in said upright orientation with at least one first reflector support pole.

* * * * *